United States Patent
Fujiu et al.

(10) Patent No.: US 6,543,807 B2
(45) Date of Patent: Apr. 8, 2003

(54) STEERING POSITION ADJUSTMENT DEVICE

(75) Inventors: Isao Fujiu, Gunma-ken (JP); Masayuki Imai, Gunma-ken (JP)

(73) Assignee: Kabushiki Kaisha Yamada Seisakusho, Gunma-Ken (JP)

( * ) Notice: Subject to any disclaimer, the term of this patent is extended or adjusted under 35 U.S.C. 154(b) by 0 days.

(21) Appl. No.: 09/899,549

(22) Filed: Jul. 6, 2001

(65) Prior Publication Data

US 2002/0024208 A1 Feb. 28, 2002

(30) Foreign Application Priority Data

Jul. 7, 2000 (JP) .......................................... 2000-207340

(51) Int. Cl.[7] .................................................. B62D 1/18
(52) U.S. Cl. ......................................... 280/775; 74/493
(58) Field of Search ........................... 280/775, 777; 74/493, 530

(56) References Cited

U.S. PATENT DOCUMENTS

| | | | | |
|---|---|---|---|---|
| 4,507,982 A | * | 4/1985 | Turner et al. ................... | 74/493 |
| 4,607,540 A | * | 8/1986 | Kinoshita et al. .............. | 74/493 |
| 5,222,410 A | * | 6/1993 | Kinoshita ....................... | 74/493 |
| 6,036,228 A | * | 3/2000 | Olgren et al. ................. | 280/775 |
| 6,095,012 A | * | 8/2000 | Lutz ............................... | 74/493 |
| 6,189,405 B1 | * | 2/2001 | Yazane ........................... | 74/493 |
| 6,244,128 B1 | * | 6/2001 | Spencer et al. ................ | 74/493 |

\* cited by examiner

*Primary Examiner*—Paul N. Dickson
*Assistant Examiner*—David R. Dunn
(74) *Attorney, Agent, or Firm*—Lowe Hauptman Gilman & Berner, LLP

(57) ABSTRACT

A steering device comprises a fixed bracket 1; a movable bracket 2, to which a steering column 10 is attached; two sets of through holes 3, 3 including front and back through hole sets formed in fixed bracket 1 and movable bracket 2, respectively, at least one set a transverse slot 3a and a vertical slot 3b intersecting each other; two clamping/fastening bolts 5, 5 inserted through holes 3, 3; an arm member 6 fastened to one of clamping/fastening bolts 5,; an operating lever member 9; a retaining member 7 for holding the clamping/fastening bolts 5, 5 to be spaced by a predetermined distance; and a linking member 8, which is pivotally linked to the arm member 6 and operating lever member 9.

14 Claims, 7 Drawing Sheets

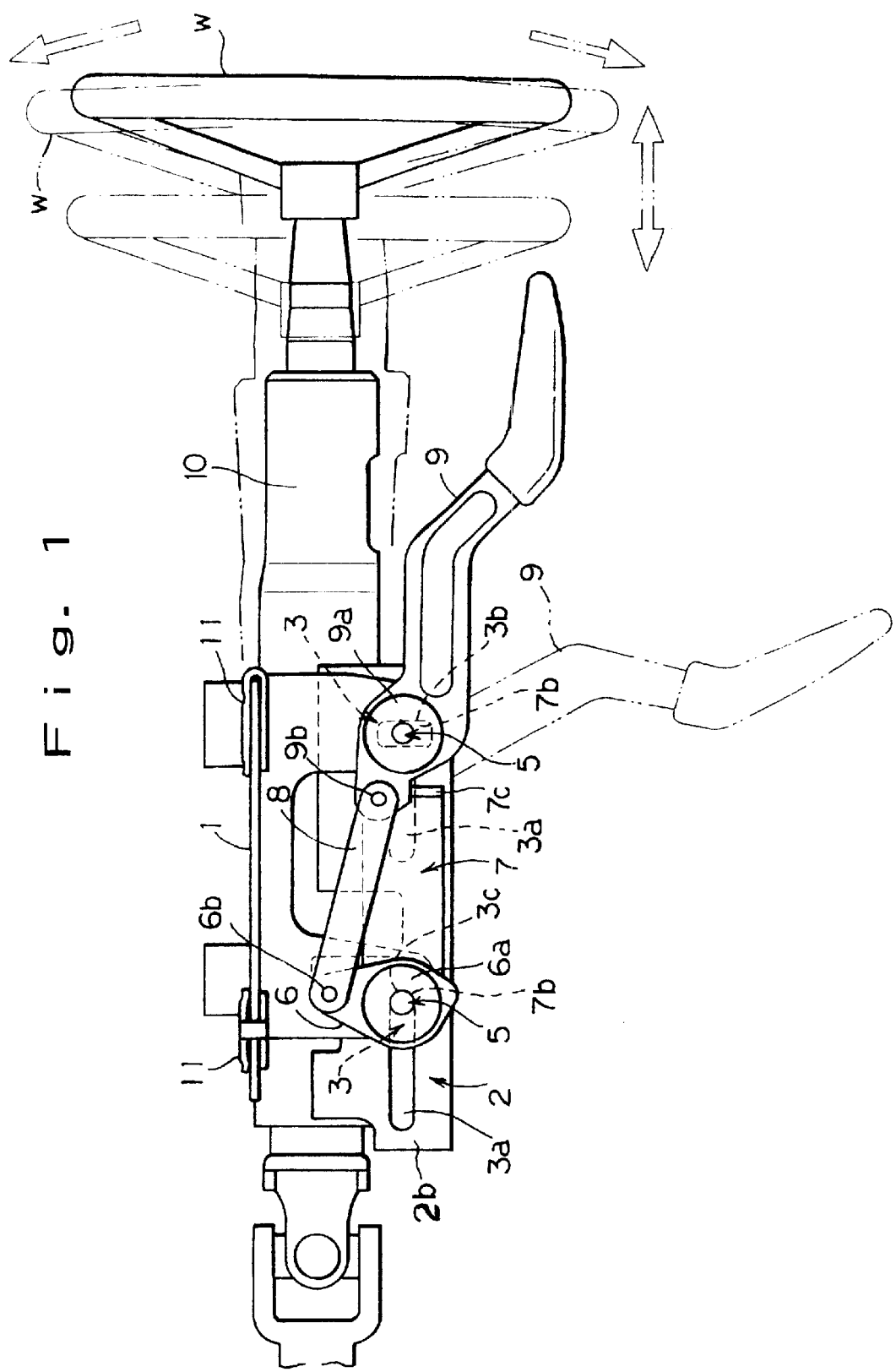

STEERING POSITION ADJUSTMENT DEVICE

BACKGROUND OF THE INVENTION

1. Field of the Invention

The present invention relates to a steering device of the type which carries out tilt/telescopic adjustments using two clamping/fastening bolts disposed at front and back locations, and relates to a steering position adjustment device, which can stabilize and improve operations of the tilt/telescopic adjustments, and can improve the operating feeling of the lever operation.

2. Description of the Related Art

As for a steering column comprising a tilt/telescopic adjustment device, there have existed for some time those of the type in which a fixed bracket and a movable bracket are supported by a front-back dual-location tightening device, and the fixed bracket and movable bracket are tightened and loosened by tightening and loosening the screws of the tightening device.

This tilt/telescopic adjustment device is configured such that, when an operating lever is pivoted in a loosening direction, a tightening device of the operating lever and a tightening device of an arm member are set in a linked state by a linking member. As for the tightening device, since only the intermediate shaft portion is restrained by a locking member of the head portion of the tightening device on the opposite side to the operating lever and arm member, and the shaft-end of the tightening device on the side of the operating lever and arm member is in a free state in contrast to the fixed state of the opposite side thereof resulting from the restraining of the end, the tightening device will arbitrarily move in any direction, upward or downward, forward or backward.

In the rotating operation of the operating lever, the shafts of the operating lever and arm member fluctuate in accordance with the movement and twisting of the shafts, the tightening force is dispersed and freed due to the movement, and, accordingly, there is a danger that an insufficient retaining force will be achieved, and further, there are times when tightening cannot be made stable, and the operating feeling is impaired.

The irregular movement of the operating lever and arm member tilt/telescopic adjustments cannot be suppressed by a simple structure. Furthermore, in the above-mentioned example, the tightening devices of both the operating lever and the arm member are inserted and positioned inside intersecting long holes comprising a transverse slot and a vertical slot, but the irregular movement is not limited thereto, and the same problem exists with a tilt/telescopic adjustment device in which the tilt/telescopic steering operating lever, arm member and linking member are tightened at two locations.

For example, a firm retaining force can be achieved, the tightening force can be made stable, and the operating feeling of lever operation can be made extremely better without moving the operating lever and arm member at the tightening time. Further, a fixed structure, which links one operating lever and arm member to one bracket via a linking member, and which provides a dual-location tightening device, has been known to be capable of being tightened by a rotating operation of a lever, but, a problem persists in that although multiple dual-location tightening devices on one bracket provide more secure fastening than with a single tightening device type, the operational stability and operating feeling cannot be easily improved.

SUMMARY OF THE INVENTION

Accordingly, as a result of the inventors' studious research to solve the above-mentioned problems, the present invention is accomplished to provide a steering position adjustment device comprising a fixed bracket; a movable bracket, to which a steering column is attached; two sets of through holes including front and back through hole sets, which are formed in the fixed bracket and movable bracket, respectively, and at least one set of which includes a transverse slot and a vertical slot intersecting each other; two clamping/fastening bolts which are inserted through these through holes; an arm member, which screws on one of the clamping/fastening bolts; an operating lever member; a retaining member for holding the clamping/fastening bolts, which are screwed in the arm member and operating lever member, respectively, at the centers of turning, so as to be spaced by a predetermined distance; and a linking member, which is pivotally linked to the arm member and operating lever member, so that support is provided by the through holes formed at two locations, and by the fastening of the fixed and movable brackets by the two clamping/fastening bolts inserted through the through holes at the respective two locations. In this arrangement, it is possible to provide positional adjustment on a steering column having a stopper mechanism, which is capable of stabilizing, at a suitable position, a tightening position and a loosening position of the operating lever, which has an arm linked via the linking member, irregardless of the movement position of the movable bracket relative to the fixed bracket, thus solving the above-mentioned problems.

BRIEF DESCRIPTION OF THE DRAWINGS

FIG. 1 is a side view of the device according to an embodiment of the present invention;

DESCRIPTION OF THE PREFERRED EMBODIMENTS

Figure 2A:
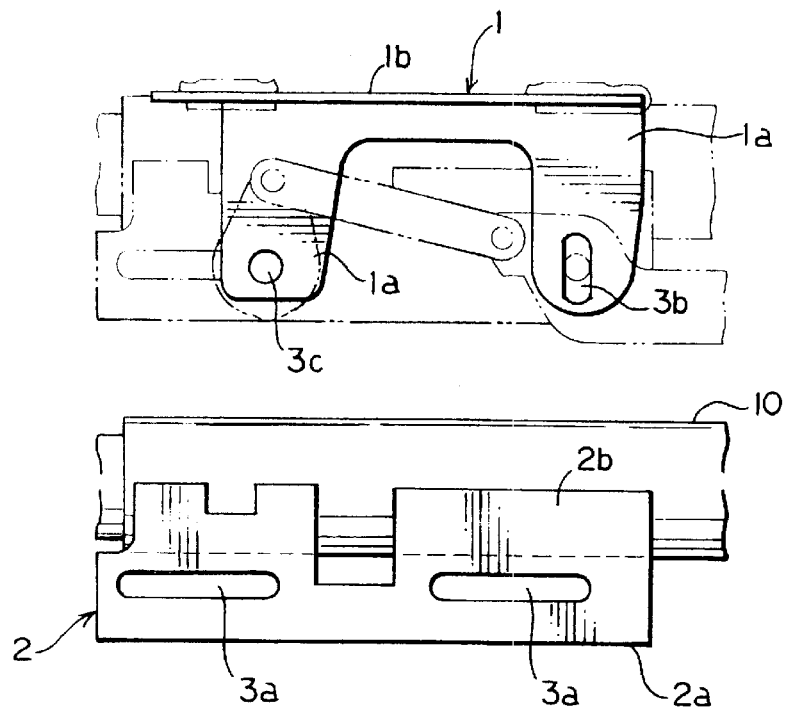
FIG. 2A shows separate side views of a fixed bracket and a movable bracket.

The embodiments of the present invention will be explained hereinbelow with reference to the figures. Firstly, a first embodiment of the present invention includes a fixed bracket 1 and a movable bracket 2. The fixed bracket 1 is affixed to a predetermined location of a car body, and the movable bracket 2 is supported by fixed bracket 1 (Refer to FIG. 1, and FIGS. 2A, 2B). There is also provided a steering wheel position adjustment portion, comprising through holes 3 extending through both sides of a bracket constituted by fixed bracket 1 and movable bracket 2.

Fixed bracket 1 includes a pair of right and left support side plates 1a and mounting plate portions 1b. The two support side plates 1a, 1a sandwich and hold movable bracket 2, which will be explained hereinbelow. The two mounting plate portions 1b, 1b are mounted via capsule members 11, 11, or the like, at a predetermined position inside the vehicle, and constitute a structure, which absorbs impact energy while sliding against resistance relative to the mounting position only when a collision or shock occurs, thereby softening the impact and protecting the driver (Refer to FIGS. 1, 2A, 2B, and so on).

Next, movable bracket 2 is mounted in a sandwiched state between the two support side plates 1a, 1a of the fixed bracket 1. Movable bracket 2 thereof a column support member 2a and movable support members 2b. Column support member 2a is a member, which serves to support and affix a steering column 10. Further, the two movable support members 2b, 2b are mounted to the fixed bracket 1 so as to enable position adjustment as desired (Refer to FIG. 2B).

Next, through holes 3 either include a transverse slot 3a and a vertical slot 3b, or a transverse slot 3a and a round hole 3c. Through holes 3 perform the role of allowing the fixed bracket 1 and movable bracket 2 to carry out a tilt adjustment operation and a telescopic adjustment operation. The vertical slot 3b mainly performs a tilt adjustment, and the transverse slot 3a mainly performs a telescopic adjustment.

A tilt adjustment of a steering wheel W can be carried out by through holes 3, 3 (Refer to FIG. 1). The fixed bracket 1 is provided with a pair of left and right vertical slots 3b, which extend through two support side plates 1a, 1a thereof, and two sets of these vertical slots 3b are positioned along the longitudinal direction (equivalent to the axial direction of the steering column) of fixed bracket 1 (Refer to FIG. 3B).

Figure 3A:
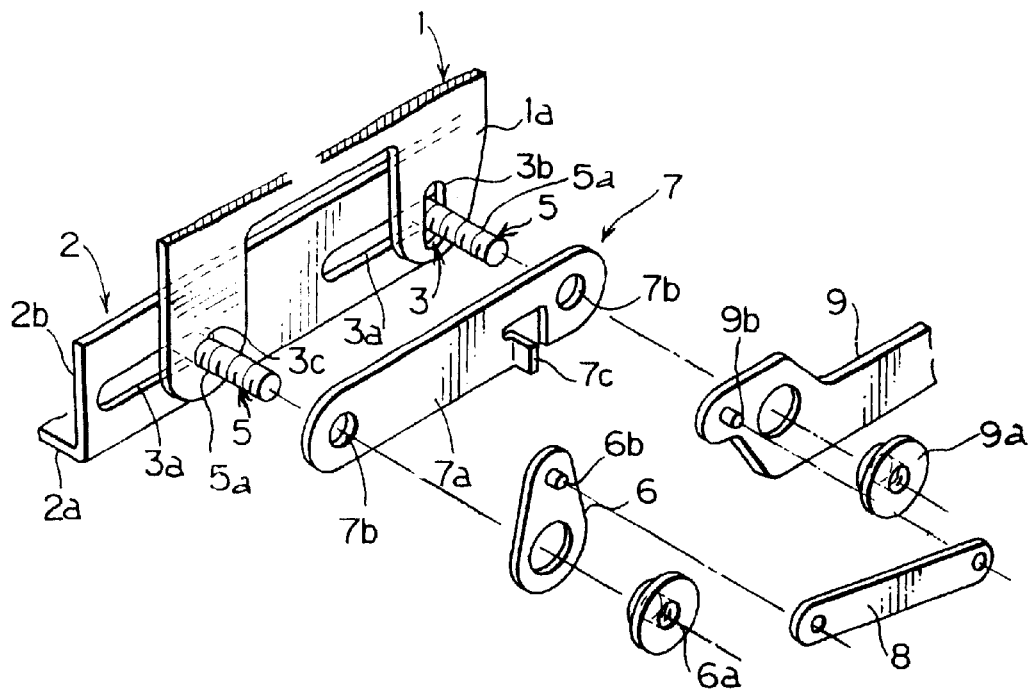
FIG. 3A is an exploded perspective view of the principle parts of the device according to an embodiment of the present invention.
Figure 3B:
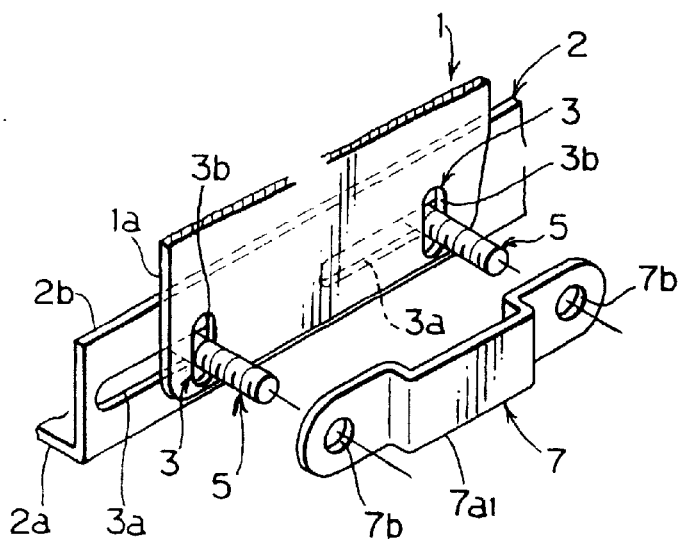
FIG. 3B is an exploded perspective view of the principal parts of the device according to another embodiment of the present invention using an alternative retaining member.

Similarly, movable support member 2b of movable bracket 2 is provided with a pair of left and right transverse slots 3a, which extend in the widthwise direction, and two sets of these transverse slots 3a are positioned along the longitudinal direction of movable support member 2b (Refer to FIG. 3B). Further, it is within the scope of the invention to provide an embodiment in which through hole 3, which is composed of vertical slot 3b and transverse slot 3a, is provided only on one side, while through hole 3 on the other side is composed of a transverse slot 3a and a round hole 3c, so that a telescopic adjustment operation (or an operation including a small-scale tilt adjustment) is mainly performed (Refer to FIG. 2A and FIG. 3A).

Movable support members 2b, 2b of movable bracket 2 are assembled so as to be sandwiched by the two support side plates 1a, 1a of fixed bracket 1. Through holes 3, 3 are formed by positioning the vertical slot 3b and transverse slot 3a to intersect each other approximately in a cross shape. Clamping/fastening bolts 5, 5 are inserted through these through holes 3, 3.

Figure 2B:
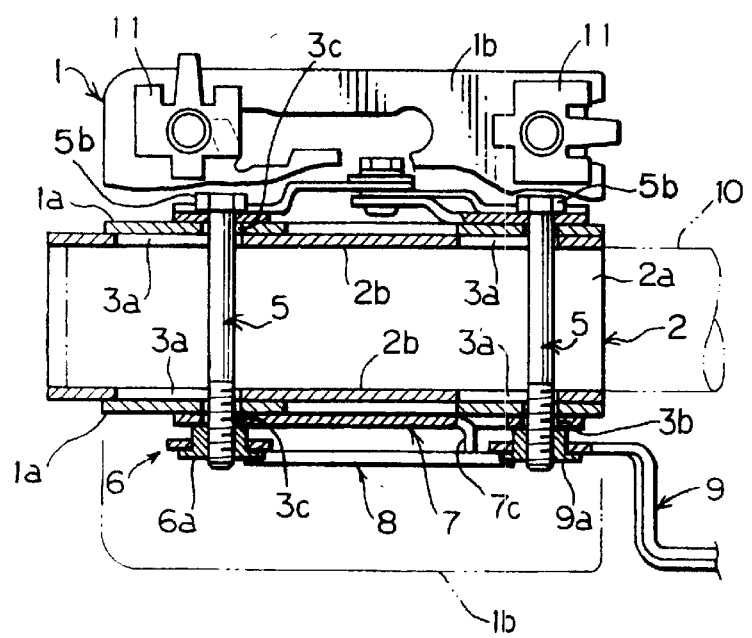
FIG. 2B is a partial cross-sectional plan view of the fixed bracket and movable bracket assembled together.

Movable support member 2b of movable bracket 2 is pressed and affixed to support side plate 1a of fixed bracket 1 by a tightening force resulting from screwing the clamping/fastening bolt 5 into an inner threaded portion 6a, which will be explained later (Refer to FIG. 1 and FIG. 2B). The inner threaded portion 6a, as shown in FIG. 3A, is made as a separate member from arm member 6, but is mounted securely to the main body of arm member 6.

Alternatively, inner threaded portion 6a can also be integrally formed with the main body of arm member 6. Arm member 6 is attached to either one of the two clamping/fastening bolts 5, 5, and this arm member 6 rotates by screwing onto clamping/fastening bolt 5, and can perform the tightening and loosening of fixed bracket 1 and movable bracket 2 (Refer to FIG. 2B).

As explained hereinabove, vertical slots 3b are formed in both support side plates 1a, 1a of fixed bracket 1, and transverse slots 3a are formed in movable support members 2b, 2b of movable bracket 2. However, the reverse arrangement is also within the scope of the present invention, i.e., the vertical slots 3b can be formed in the movable bracket 2, and the transverse slots 3a can be formed in the fixed bracket 1.

A tilt adjustment operation is performed by movable bracket 2 moving parallel to the longitudinal direction of vertical slot 3b relative to fixed bracket 1, and a telescopic adjustment operation can be performed by movable bracket 2 moving parallel to the longitudinal direction of transverse slot 3a. Then, the desired tilt/telescopic adjusted position of the steering wheel W can be fixed by tightening the clamping/fastening bolt 5.

The arm member 6 is a rotating member of a flat plate shape, with a hole through which a threaded shank of the clamping/fastening bolt 5 extends (Refer to FIG. 1). As described above, the hole is formed in inner threaded portion 6a, which engages with the threaded shank 5a of clamping/fastening bolt 5. This inner screw portion 6a engages with the threaded shank 5a, and, by the rotating operation of the arm member 6, the bolt head portion 5b of the clamping/fastening bolt 5 and the arm member 6 apply pressure to the support side plates 1a, 1a of the fixed bracket 1, thereby enabling the side plates 1a of fixed bracket 1 to sandwich and fix movable bracket 2 (Refer to FIG. 2B)

Further, a pivoting portion 6b is formed on arm member 6 at a predetermined distance from the inner threaded portion 6a. This pivoting portion 6b is a part, to which a linking member 8, which will be explained hereinbelow, is mounted. The linking member 8 has a flat plate shape, and the arm member 6 and an operating lever member 9 are mounted at the two ends of linking member 8 (Refer to FIG. 1).

The linking member 8 is pivotally linked via a pin member, or the like, to pivoting member 6b of arm member 6 and a pivoting member 9b of operating lever member 9 (Refer to FIG. 1, and FIG. 3A). The arm member 6, linking member 8 and operating lever member 9 constitute a linking mechanism, and arm member 6 is linked so as to rotationally follows the rotating direction of the lever member 9, via linking member 8, and perform a corresponding rotating motion.

The operating lever member 9 has, an inner threaded portion 9a, which engages with one of the clamping/ fastening bolts 5, and performs the tightening and loosening operations of the clamping/fastening bolt 5, and further, also performs the tightening and loosening operations of the arm member 6 to/from the respective clamping/fastening bolt 5 at the arm member 6 side via the linking member 8.

A retaining member 7 is attached between the shafts of the clamping/fastening bolt 5 of the operating lever member 9 and the clamping/fastening bolt 5 of arm member 6. This retaining member 7 serves to retain arm member 6 and operating lever member 9 at a constant distance at all times. This retaining member 7 has distance retaining holes 7b, 7b, through which the two clamping/fastening bolts 5, 5 pass, and which are formed at both longitudinal ends of a flat plate portion 7a (Refer to FIGS. 3A, B). The retaining member 7 is arranged on fixed bracket 1 by way of a washer, or the like, supports both clamping/fastening bolts 5, 5 at the distance retaining holes 7b, 7b, and maintains the arm member 6 and operating lever member 9 at a predetermined distance (Refer to FIG. 1 and FIG. 2B).

The retaining member 7 is preferably at least separated from the fixed bracket 1 in a region between the the tightening two locations of the two clamping/fastening bolts 5, 5. In one embodiment, member 7 has a recessed portion $7a_1$ that creates a non-contact region, for reducing the contact area between the fixed bracket 1 and retaining member 7, and, in turn, facilitating tilt/telescopic adjustment operations.

The simplest method for forming the recessed portion $7a_1$ is to provide a washer between fixed bracket 1 and retaining member 7. Furthermore, as shown in FIG. 1, FIG. 2A and FIG. 3A, it is possible to form a cut off portion, between the attaching parts of the two clamping/fastening bolts 5, 5, on the support side plate 1a of the fixed bracket 1, and to use this cut-off portion as the recessed portion $7a_1$.

Figure 6:
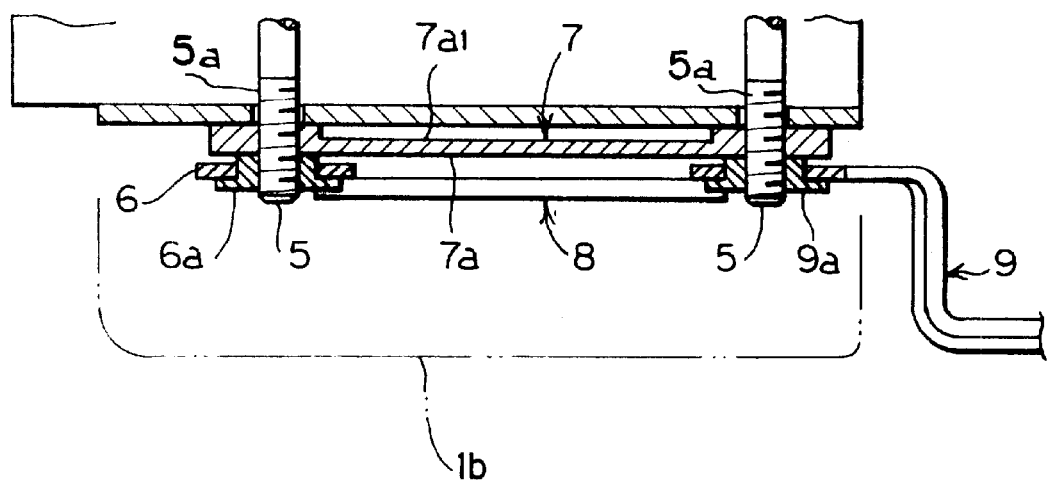
FIG. 6 is a cross-sectional view of the principal parts of the present invention using a retaining member, which forms a recessed portion.

In an alternative embodiment central area of the flat plate portion 7a, excluding the two longitudinal ends, is bent and formed into an approximate convex shape, and this convex shape part is used as recessed portion $7a_1$, making a non-contact part with respect to fixed bracket 1 (Refer to FIG. 3B). Further, the recessed portion $7a_1$, which is bent to form the convex shape, can be used as a latching portion for rotation regulation of the operating lever member 9 and arm member 6. In the case of the retaining member 7, it is also possible to eliminate the need for a washer. Furthermore, it is also possible to form a thickness-reduced part of a flattened concave shape in the surface of retaining member 7 that faces fixed bracket 1, and to use this thickness-reduced part as recessed portion $7a_1$, forming a non-contact part with respect to the fixed bracket 1 (Refer to FIG. 6).

Further, there exists an embodiment, wherein a latching portion 7c is formed on retaining member 7. This latching portion 7c is such that, when either the operating lever member 9 or arm member 6 has rotated a fixed extent, the same makes contact with the latching portion 7c and stops, that is, portion 7c regulates the rotating range of operating lever member 9 and arm member 6 (Refer to FIG. 1).

This latching portion 7c is formed by cutting and bending up one portion of flat plate portion 7a (Refer to FIG. 3A). Alternatively, a pin member, or the like, is fixed to flat plate portion 7a for use as latching portion 7c, and the shape of the pin member is not limited to particular shapes. Further, as explained hereinabove, the approximate convex-shaped recessed portion $7a_1$ can also be used as latching portion 7c.

By providing latching portion 7c on retaining member 7 for rotation regulation of the operating lever member 9 and arm member 6, it is possible to suppress deflection movements of the clamping/fastening bolt 5 of operating lever member 9 and the clamping/fastening bolt 5 of arm member 6, and to easily limit, in a suitable range, the rotation of the operating lever member 9 and arm member 6. Further, it is possible to improve the operational stability of the linking mechanism including operating lever member 9 and arm member 6 without applying excessive force to the linking member 8.

In accordance with an embodiment, the distance between linkages on the linking member 8 with the operating lever member 9 and arm member 6 is different from the distance between retaining holes of the retaining member 7 in which the clamping/fastening bolts 5, 5 of operating lever member 9 and arm member 6 are retained. Here, the distance between retaining holes 7b of the retaining member 7 is referred to as shaft support distance La, and the distance between the linkages of linking member 8 is referred to as pivotal linkage distance Lb.

Figure 7:
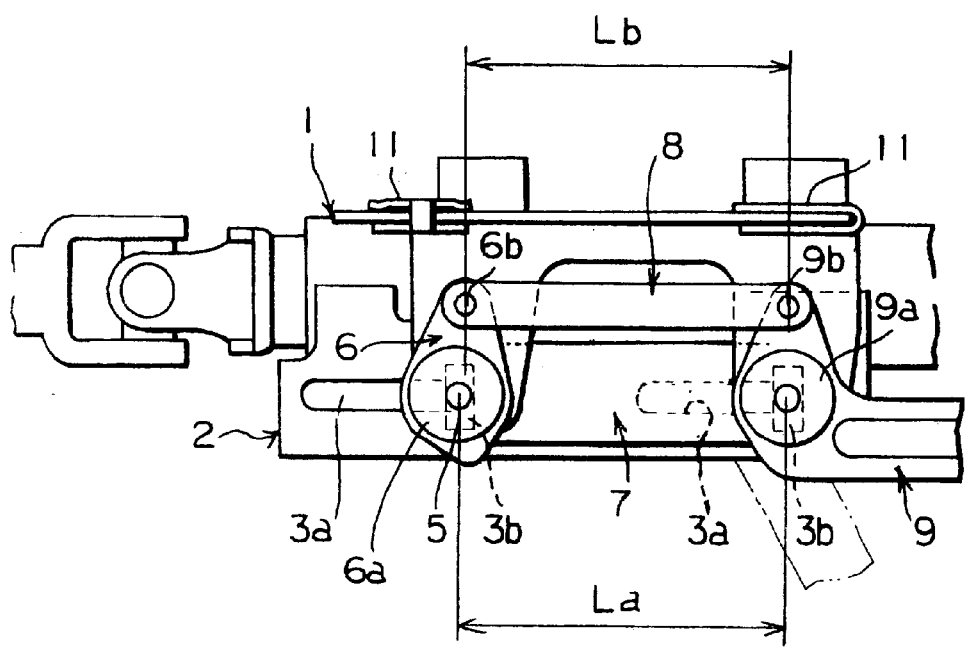
FIG. 7 is a side view of the principal parts of the present invention, in which the retaining member and linking member have equal lengths.

When shaft support distance La and pivotal linkage distance Lb, as shown in FIG. 7, are made equal with members 7 and 8 being parallel, the rotating ranges of operating lever member 9 and arm member 6 are equal, and the tightening and loosening operations of the two clamping/fastening bolts 5, 5 are performed approximately equally in a well balanced manner.

By making pivotal linkage distance Lb either smaller or larger than shaft support distance La, it is possible to make the rotating angles of the operating lever member 9 and arm member 6 different from each other. Thus, the vertical slot 3b associated with operating lever member 9 and clamping/fastening bolt 5 can serve as a tilt support point when adjusting a tilting position of the steering wheel W.

Figure 4A:
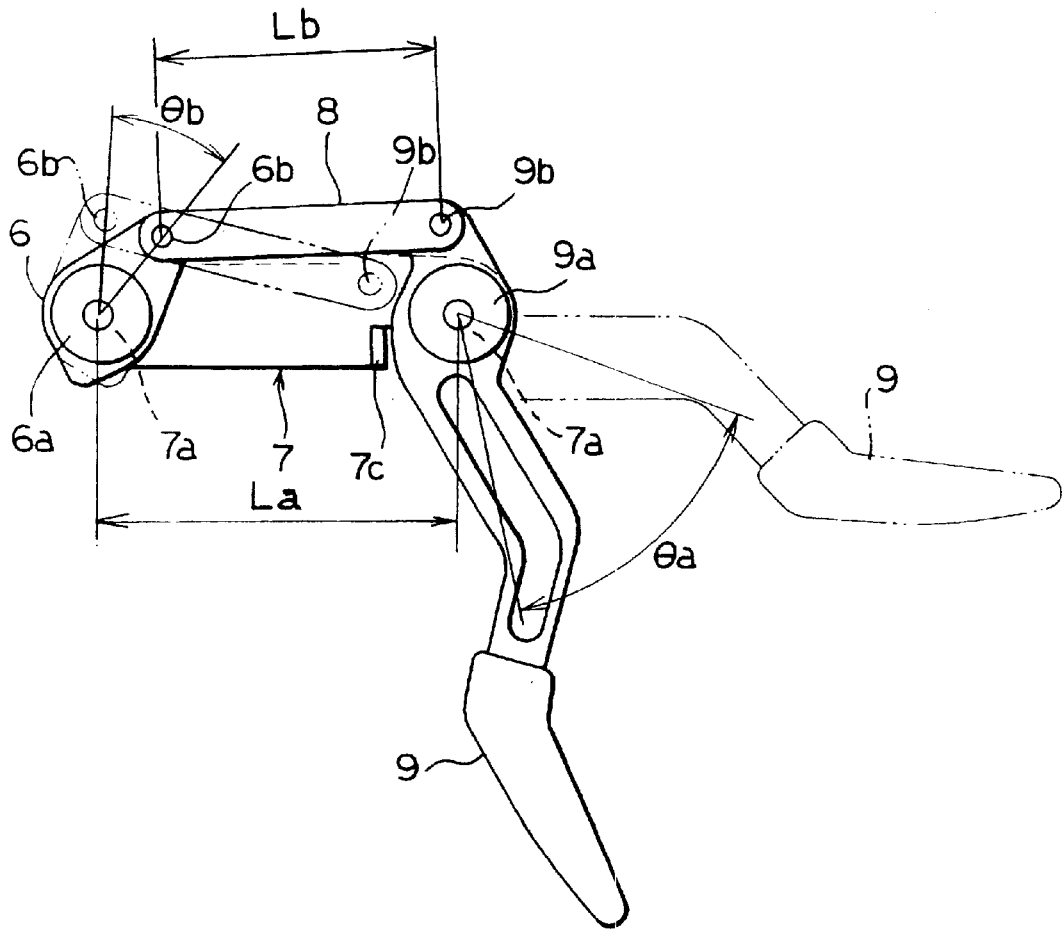
FIG. 4A is an operational diagram of the principal parts in a tilt/telescopic adjustment with the pivotal linkage distance of a linking member smaller relative to the shaft support distance of a retaining member.

That is, with a dual-location clamping/fastening device, comprising an arm member 6 side, which also serves as a tilt support point for fixed bracket 1 and movable bracket 2, and an operating lever member 9 side, which performs an adjustment when being guided to an arbitrary tilting position, moving and adjusting the operating lever member 9 side to the arbitrary position while setting the arm member 6 side to a fixed state by slightly tightening the arm members 6 sooner than the operating lever member 9 side improves operability even more (Refer to FIG. 4A).

Figure 4B:
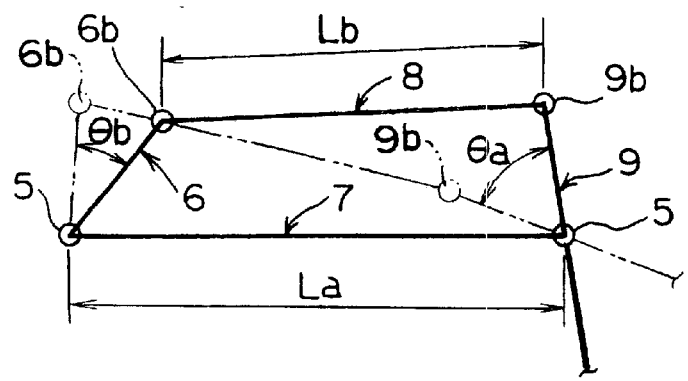
FIG. 4B is an abbreviated line drawing showing the operation of FIG. 4A.

If the pivotal linkage distance Lb of linking member 8 is shorter than shaft support distance La of retaining member 7, the rotation ratios of operating lever member 9 and arm member 6 can be suitably changed, and the rotation quantity at the angle of rotation θb of the arm member 6 can be increased relative to the rotation quantity at the angle of rotation θa of operating lever member 9 (Refer to FIG. 4B).

In this embodiment, according to the relationship between the rotation ratios of operating lever member 9 and arm member 6, and the variable quantity of linkage movement resulting from the circular arc motion of linking member 8, it is possible to vary the rotation quantity at the angle of rotation θb of arm member 6 relative to the rotation quantity at the angle of rotation θa of operating lever member 9.

In this way, by making pivotal linkage distance Lb of linking member 8 to differ from shaft support distance La of retaining member 7, and generating an angle of rotation ratio, and increasing or decreasing the size of the rotation quantity at the angle of rotation θb of arm member 6 relative to the rotation quantity at the angle of rotation θa of operating lever member 9, the tightening time of the clamping/fastening bolt 5 of the operating lever member 9 side and the clamping/fastening bolt 5 of the arm member 6 side can be made to vary as desired.

Figure 5A:
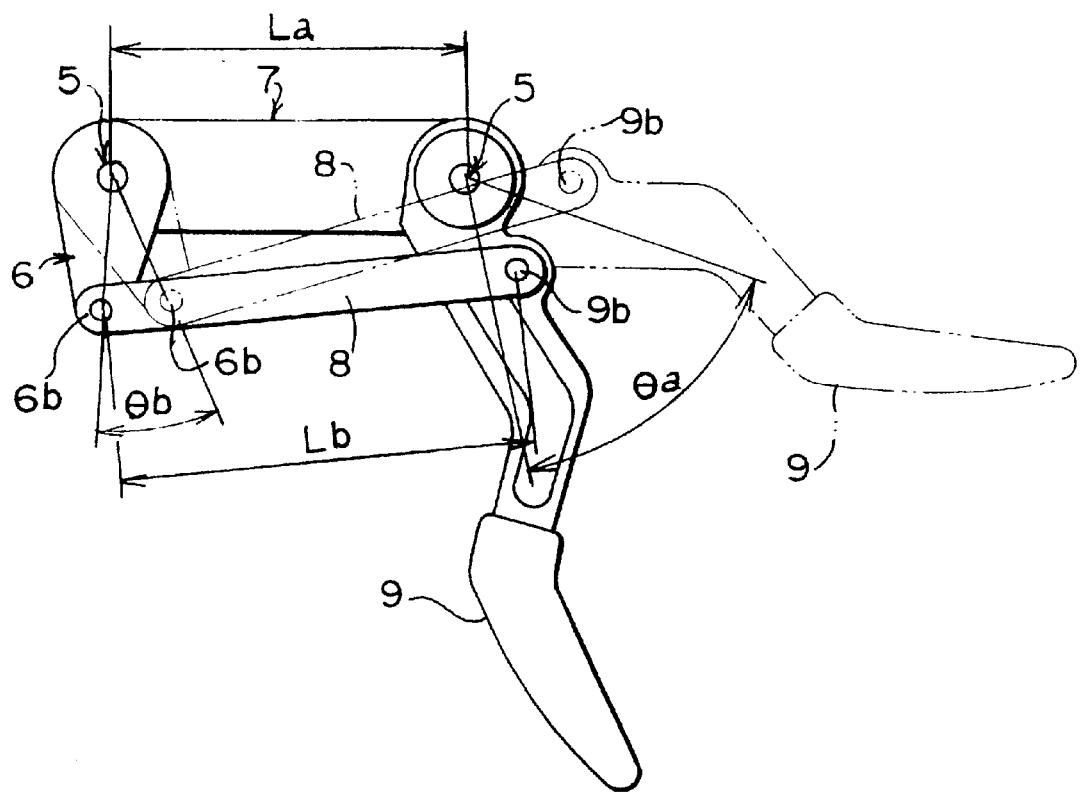
FIG. 5A is an operational diagram of the principal parts in a tilt/telescopic adjustment with the pivotal linkage distance of a linking member larger relative to the shaft support distance of a retaining member.
Figure 5B:
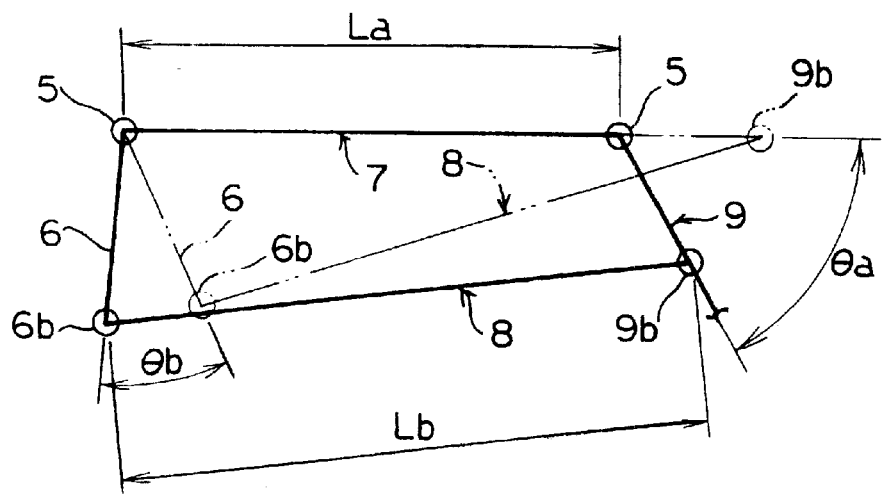
FIG. 5B is an abbreviated line drawing showing the operation of FIG. 5A.

Further, if pivotal linkage distance Lb of linking member 8 is longer than shaft support distance La of retaining member 7, similarly, it is possible to suitably change the rotation ratios of operating lever member 9 and arm member 6, and to increase the angle of rotation θa of operating lever member 9 relative to the angle of rotation θb of arm member 6 (Refer to FIG. 5A, B).

Figure 8A:
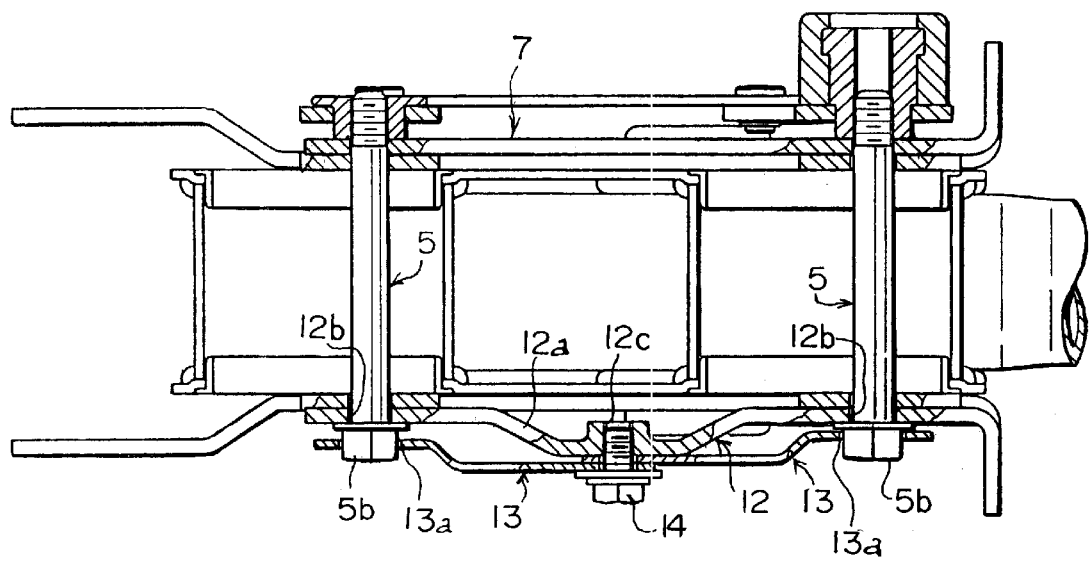
FIG. 8A is a partial cross-section plan view showing an embodiment in which a head side retaining member is disposed on the bolt head portion side of two clamping/fastening bolts.

Furthermore, it is within the scope of the invention to provide head side retaining member 12 attached to the bolt head portions 5b, 5b side of the two clamping/fastening bolts 5, 5 (Refer to FIG. 8A) This head side retaining member 12 is attached so as to be sandwiched between support side plate 1a and bolt head portion 5b. The head side retaining member 12 includes two retaining through holes 12b, 12b, through which the clamping/fastening bolts 5, 5 pass, and which are formed in the two longitudinal end parts of retaining plate portion 12a.

Figure 8B:
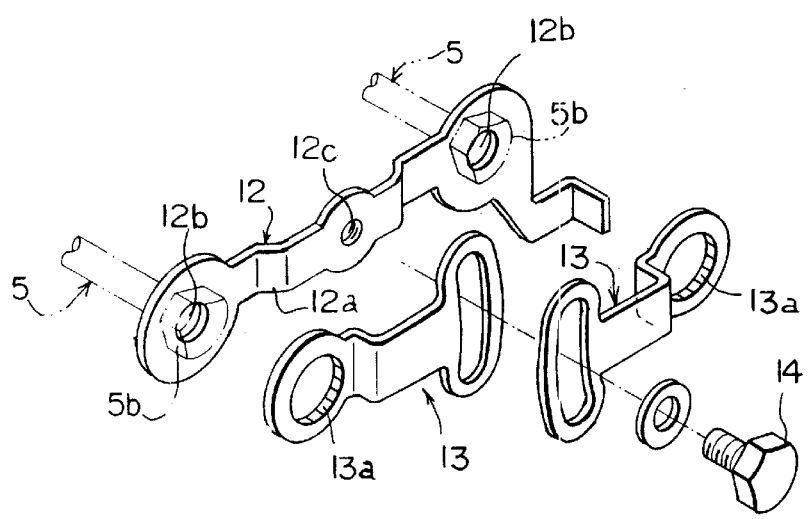
FIG. 8B is a perspective exploded view showing a clamping/fastening bolt and a locking member.

Due to the two retaining through holes 12b, 12b, the distance between the bolt head portions 5b, 5b of the clamping/fastening bolts 5, 5 is maintained constant at all times. Further, head side retaining member 12 is bent and formed so as to be separated from the support side plate 1a approximately in the central area of retaining plate portion 12a. Furthermore, a locking member 13 associated with bolt head portion 5b is attached to retaining plate portion 12a. More specifically, an inner threaded portion 12c is formed in the retaining plate portion 12a, and the locking member 13 is attached in a fixed condition to this inner portion 12c by a fastening device 14 such as a bolt (Refer to FIG. 8B). The locking member 13 has latching holes 13a, 13a of approximately the same shape as bolt head portion 5b, for receiving bolt head portion 5b therein. By inserting the bolt head portions 5b, 5b into the latching holes 13a, 13a, the bolt head portion 5b is latched by the latching hole 13a, preventing clamping/fastening bolt 5 from slipping in the direction of the shaft circumference.

The present invention relates to a steering position adjustment device comprising a fixed bracket 1; a movable bracket 2, to which a steering column 10 is attached; two sets of through holes 3, 3 including front and back through hole sets, which are formed in the fixed bracket 1 and movable bracket 2, respectively, and at least one set of which includes a transverse slot 3a and a vertical slot 3b intersecting each other; two clamping/fastening bolts 5, 5, which are inserted through these through holes 3, 3; an arm member 6, which screws on one of the clamping/fastening bolts 5, 5; an operating lever member 9; a retaining member 7 for holding the clamping/fastening bolts 5, 5, which are screwed in the arm member 6 and operating lever member 9, respectively, at the centers of turning, so as to be spaced by a predetermined distance; and a linking member 8, which is pivotally linked to the arm member 6 and operating lever member 9, thereby stabilizing and improving the operation of the steering column and the rotational operation of the operating lever member and so on, and providing better feeling of lever operation when performing a tilt/telescopic adjustment.

The above effects are explained in detail as follows. Since shaft support distance La between the tightening shaft members of the operating lever member 9 and arm member 6 is securely maintained by retaining member 7, the action of the linkage, which links operating lever member 9 and arm member 6, can be made extremely better and stabilized. If member 7 is absent, even if linking member 8, operating lever member 9 and arm member 6 are securely linked together, it is still impossible to deter movements of the tightening shaft members of operating lever member 9 and arm member 6, and troubles occur, e.g., instable tightening operation and lost operating feeling during operation. However, if retaining member 7 of the present invention is provided., it is possible to improve and stabilize operability in a dual-location clamping/fastening support device of one bracket, and to provide better operating feeling.

Another aspect of the invention relates to the steering position adjustment device of the type described above, wherein shaft support distance La defined between the axes of the clamping/fastening bolts 5, 5 held by retaining member 7 is different from pivotal linkage distance Lb between the pivotal axes of linking member 8, whereby the rotation ratios of operating lever member 9 and arm member 6 can be suitably changed to impart change to the tightening state of the clamping/fastening bolts 5, 5.

The above effects are explained in detail as follows. Since the clamping/fastening bolts 5 of operating lever member 9 and arm member 6 can be securely retained by the retaining member 7, when the rotation transfer ratio is changed by making pivotal linkage distance Lb of operating lever member 9 and arm member 6 different from shaft support distance La of retaining member 7, for example, by setting the angle of rotation of arm member 6 larger than the angle of rotation of operating lever member 9 at initial operation, it is possible to easily adjust member 9 to an arbitrary adjustment position while setting the arm member 6 side to a tightened state. Thus, operability can be improved, and a better operation feeling can be provided.

When the angle of rotation of operating lever member 9 and arm member 6 is changed in the described manner, the deflection (movement) of the operating lever member 9 and arm member 6 operation can be deterred by retaining member 7, and the operability of the dual-location clamping/fastening device with the changed angles of rotation, can be greatly enhanced.

Another aspect of the invention relates to the steering position adjustment device of the type described above, wherein pivotal linkage distance Lb of linking member 8 is smaller than shaft support distance La of retaining member 7. As a result, in a rotating operation of the operating lever member 9, different fastening timings can be obtained by making the angle of rotation θb of arm member 6 smaller than the angle of rotation θa of operating lever member 9, and by making the rotation quantity at the angle of rotation θa of the operating lever member 9 and the rotation quantity at the angle of rotation θb of the arm member 6 variable. Further, according to this invention, it is possible to enhance the rigid feeling of linking member 8 by linking the operating lever member 9 and the arm member 6, and thus to further improve the operability.

Another aspect of the invention relates to the steering position adjustment device of the type described above, wherein pivotal linkage distance Lb of linking member 8 is larger than shaft support distance La of retaining member 7, whereby it is possible to set the rotation ratios of the angle of rotation θa of the operating lever member 9 and the angle of rotation θb of the arm member 6 so as to make the tightening timing of members 6 and 9 to differ by varying the rotation quantity of angle of rotation θb relative to the rotation quantity at the angle of rotation θa. In this case, the linking part of operating lever member 9 and arm member 6 can be provided arbitrarily, and a suitable rotation ratio can be set easily, and further, this rotation ratio can be set even when the space is limited due to the shapes of the fixed and movable brackets.

Another aspect of the invention relates to the steering position adjustment device of the type described above wherein the retaining member 7 has a recessed portion 7a₁, which does not make contact with either the fixed bracket 1 or movable bracket 2. As a result, the retaining member 7 and the fixed bracket 1 do not come into complete contact and, therefore, better tilt/telescopic adjustment feeling can be made when operating lever member 9 is loosened to perform a tilt/telescopic adjustment.

Another aspect of the invention relates to the steering position adjustment device, wherein retaining member 7 is provided with a latching portion 7c, for latching at least one of arm member 6 and operating lever member 9, whereby the latching portion 7c serves as a stopper for operating lever member 9, and the overall structure can be simplified.

Another aspect of the invention relates to the steering position adjustment device, wherein a head side retaining member 12, for holding clamping/fastening bolts 5, 5 spaced by a predetermined distance, is provided on the bolt head portions 5b, 5b of clamping/fastening bolts 5, 5. Thus, it is possible to maintain the predetermined distance both on the bolt head portions 5b, 5b side of the clamping/fastening bolts 5, 5, and on the side where the arm member 6 and operating lever member 9 are fastened. Therefore, it is possible to stabilize and retain the clamping/fastening bolts 5, 5, improve the operability thereof, and provide better operating feeling.

What is claimed is:

1. A steering position adjustment device, comprising:
    a fixed bracket having front and rear through holes formed in front and rear portions thereof;
    a movable bracket adapted to be attached to a steering column, said movable bracket having front and rear through holes formed in front and rear portions thereof to correspond to the front and rear through holes of said fixed bracket, the front and rear through holes of said brackets constituting front and rear through hole sets, respectively, the through holes of at least one of said sets including slots elongated in directions intersecting each other;
    two bolts each inserted through one of said through hole sets;
    an arm member engaged by thread with one of the bolts;
    an operating lever member engaged by thread with the other of the bolts;
    a retaining member for holding the bolts to be spaced by a predetermined distance; and
    a linking member which pivotally links to said arm member and operating lever member.

2. The steering position adjustment device according to claim 1, wherein a shaft support distance La defined between the axes of the bolts held by said retaining member is different from a pivotal linkage distance Lb between pivotal axes of said linking member.

3. The steering position adjustment device according to claim 2, wherein the pivotal linkage distance Lb of said linking member is smaller than the shaft support distance La of said retaining member.

4. The steering position adjustment device according to claim 2, wherein the pivotal linkage distance Lb of said linking member is larger than the shaft support distance La said retaining member.

5. The steering position adjustment device according to claim 1, wherein said retaining member has a recessed portion, which does not make contact with either said fixed bracket or movable bracket.

6. The steering position adjustment device according to claim 1, wherein said retaining member is provided with a latching portion for latching at least one of said arm member and said operating lever member.

7. The steering position adjustment device according to claim 6, wherein said latching portion is formed on said retaining member has a bent portion extending upright from a remainder portion that is generally planar.

8. The steering position adjustment device according to claim 1, further comprising a head side retaining member provided on bolt head portions of said bolts for maintaining a predetermined spacing between said bolt head portions.

9. The steering position adjustment device according to claim 1, wherein the other of said sets includes a transverse slot and a circular hole.

10. The steering position adjustment device according to claim 1, wherein the front and rear through holes of said movable bracket are slots elongated in an axial direction of the steering column.

11. The steering position adjustment device according to claim 1, wherein one of said elongated slots extends in an axial direction of the steering column while the other of said elongated slots extends in a direction transverse to the axial direction.

12. The steering position adjustment device according to claim 1, wherein each of said arm member and operating lever member has a projection to which said linking method pivotally links.

13. The steering position adjustment device according to claim 1, wherein said fixed bracket has a cutout in a region corresponding to a middle portion of said retaining member for reducing a contact area between said fixed bracket and said retaining member.

14. The steering position adjustment device according to claim 1, wherein said retaining member has a raised portion, which does not make contact with either said fixed bracket or movable bracket.

* * * * *